(12) United States Patent
Meyer et al.

(10) Patent No.: US 6,223,763 B1
(45) Date of Patent: May 1, 2001

(54) HYDRAULIC SYSTEM FOR ACTUATING AT LEAST TWO OPERATIONAL AREAS IN A VEHICLE

(75) Inventors: Roland Meyer, Roth; Andreas Knecht, Ammerbuch; Dieter Tischer, Wendlingen; Bernd Niethammer, Nürtingen; Alfred Trzmiel, Grafenberg, all of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/364,400

(22) Filed: Jul. 30, 1999

(30) Foreign Application Priority Data

Aug. 1, 1998 (DE) .............................................. 198 34 765

(51) Int. Cl.[7] ..................................................... F15B 11/16
(52) U.S. Cl. ......................... 137/118.01; 60/422; 91/516; 137/118.02
(58) Field of Search .............................. 60/422; 91/516; 137/118.01, 118.02

(56) References Cited

U.S. PATENT DOCUMENTS

| | | | |
|---|---|---|---|
| 3,692,064 | * 9/1972 | Hohnerlein et al. | ............... 138/42 |
| 3,841,096 | * 10/1974 | Koppen et al. | ............... 60/484 X |
| 4,658,850 | * 4/1987 | Uchino | ............... 60/422 X |
| 5,156,680 | * 10/1992 | Orzechowski | ............... 138/42 X |
| 5,398,594 | * 3/1995 | Tischer et al. | ............... 91/516 |
| 5,417,241 | * 5/1995 | Tischer et al. | ............... 137/596.17 X |
| 5,836,347 | * 11/1998 | Harries | ............... 60/422 X |

* cited by examiner

*Primary Examiner*—Gerald A. Michalsky
(74) *Attorney, Agent, or Firm*—Robert W. Becker & Associates

(57) ABSTRACT

A hydraulic system for a vehicle including a distributor, or switch, valve for actuating at least two operational areas and supplying the two areas with sufficient amounts of hydraulic medium is provided. The distributor, or switch, valve preferably comprises a flow regulator valve and a solenoid valve, which function so that the supply of hydraulic medium to the steering system always has priority, ensuring that the vehicle is steerable in any situation. When the steering system is operational, the supply of hydraulic medium to other operational areas, such as the clutch and transmission systems, is completely blocked by operation of the switch valve. If, however, the clutch and transmission systems should require hydraulic medium during operation of the steering system, the switch valve allows a small portion of hydraulic medium to be supplied to the clutch and transmission as well.

18 Claims, 5 Drawing Sheets

HYDRAULIC SYSTEM FOR ACTUATING AT LEAST TWO OPERATIONAL AREAS IN A VEHICLE

The invention relates to a hydraulic system for actuating at least two operational areas in a vehicle.

It is known to provide in vehicles a hydraulic system for the steering system and an automated manual transmission with which these two operational areas can be activated via correlated valves. For the two operational areas individual hydraulic systems with individual controls are used so that a complex and expensive design is required.

It is an object of the invention to embody the aforementioned hydraulic system such that at least two operational areas of the vehicle can be supplied with hydraulic medium in an inexpensive but reliable manner.

This object is inventively solved for the aforementioned hydraulic system.

In the inventive hydraulic system the distributor valve ensures that the two operational areas of the vehicle are supplied with sufficient amounts of hydraulic medium. The distributor valve is designed such that one of the two operational areas is given preference. If one of the operational areas is, for example, the steering system of the vehicle and the other operational area the automated manual transmission of the vehicle, then the distributor valve ensures that the steering of the vehicle has priority. This ensures that under any condition the steering of the vehicle is supplied with the required hydraulic medium. The inventive hydraulic system is constructively simple and requires only a minimal mounting space.

Further features of the invention result from the dependent claims, the description, and the drawings.

Figure 1:
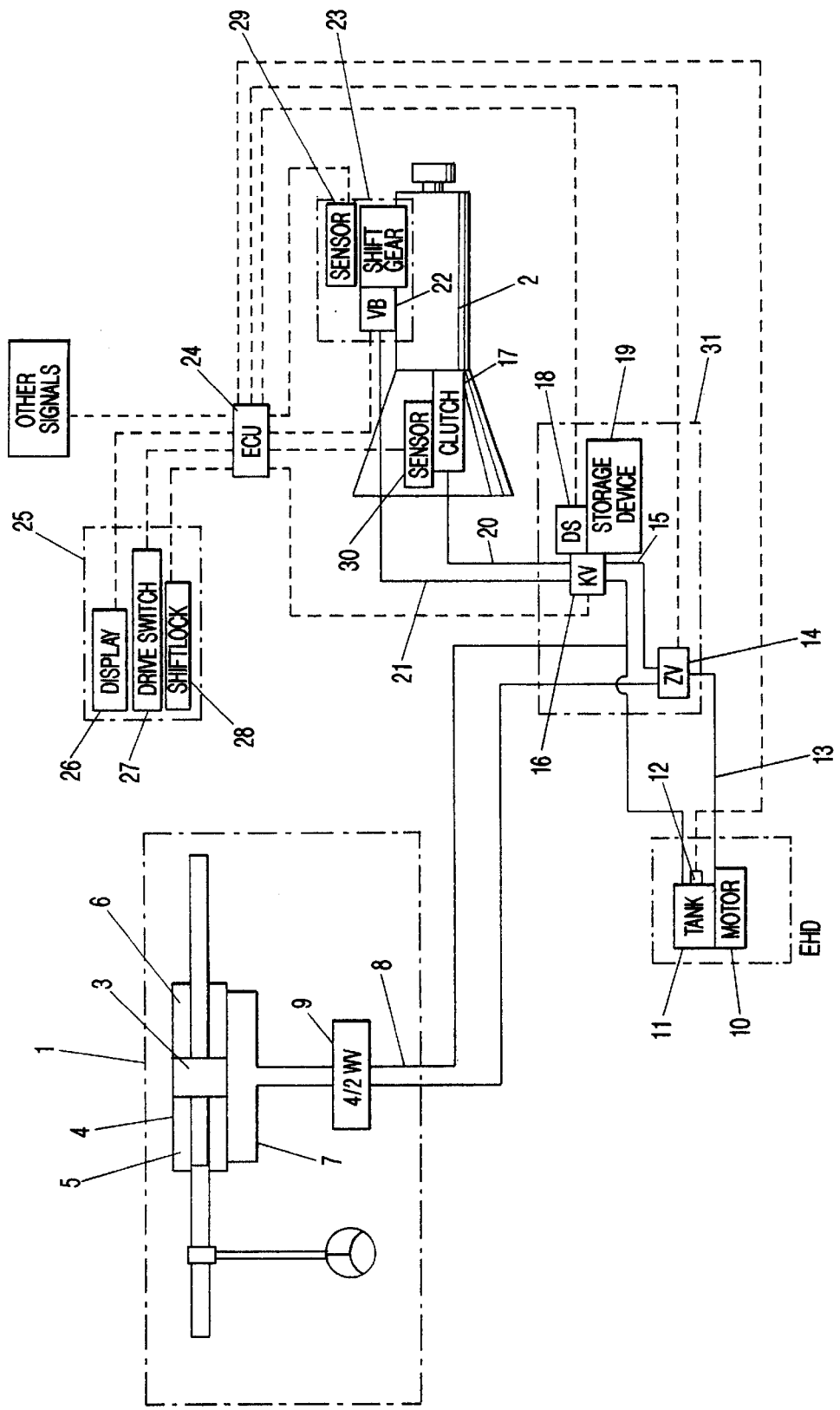
Figure 2:
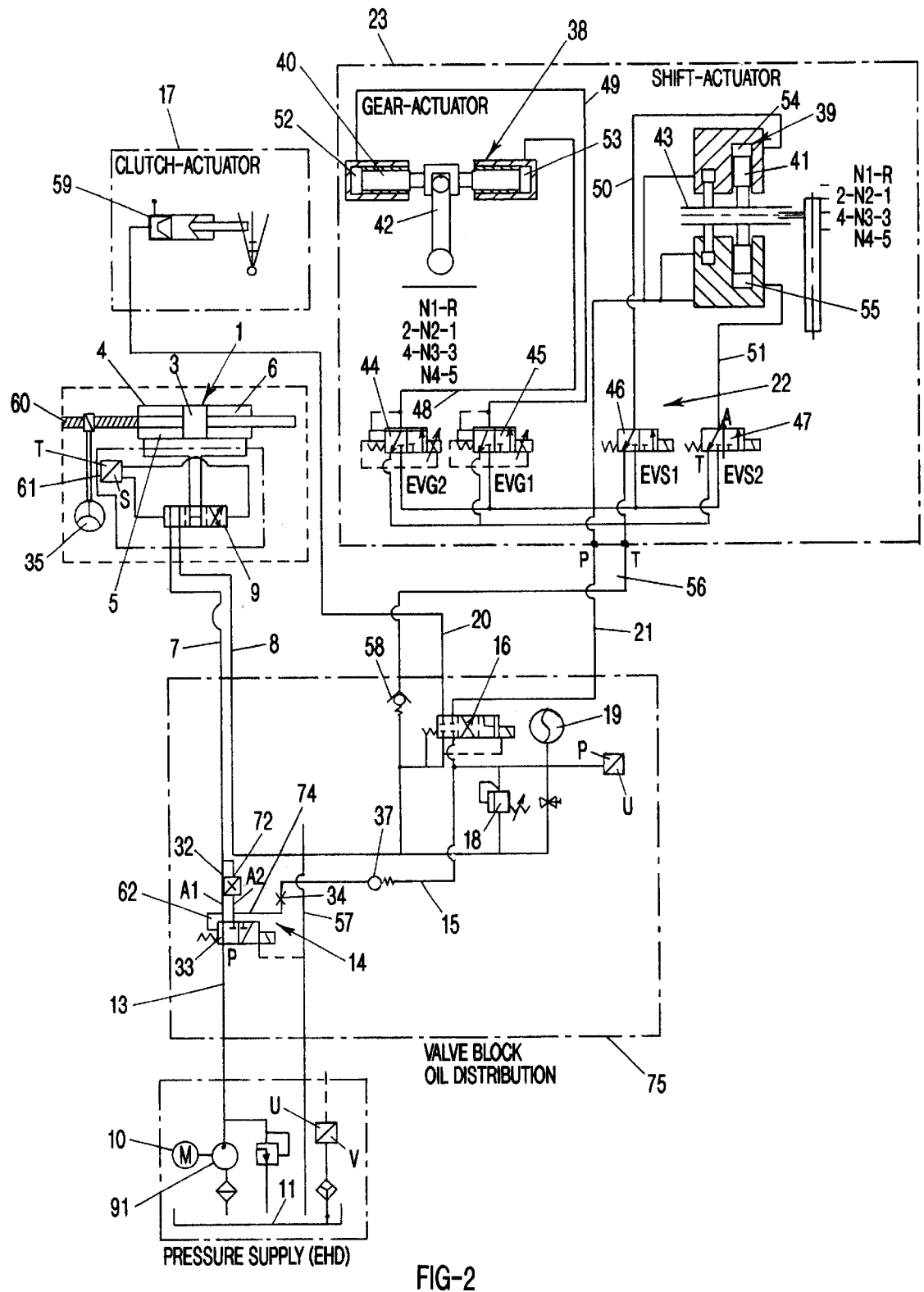
Figure 3:
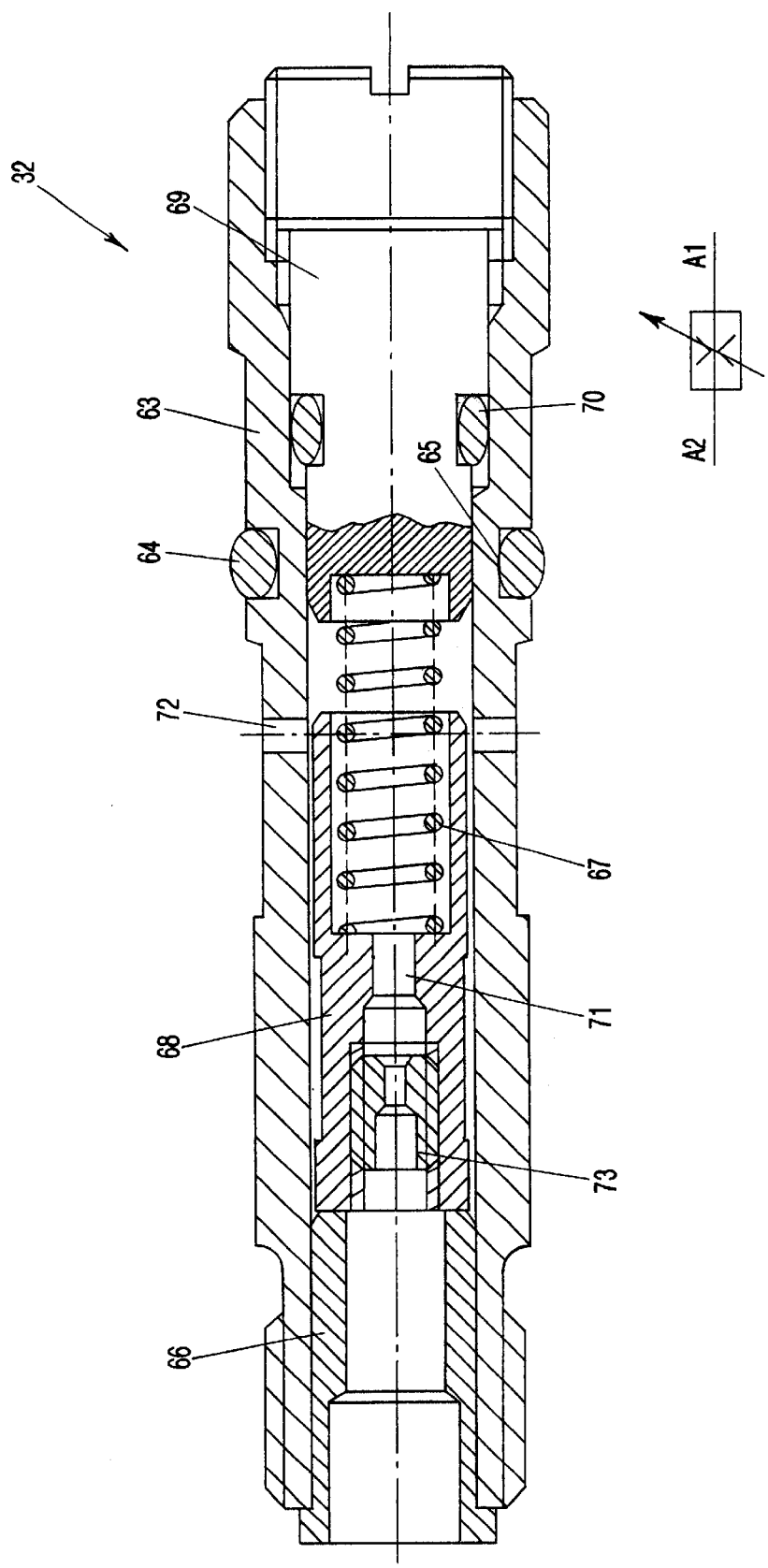
Figure 4:
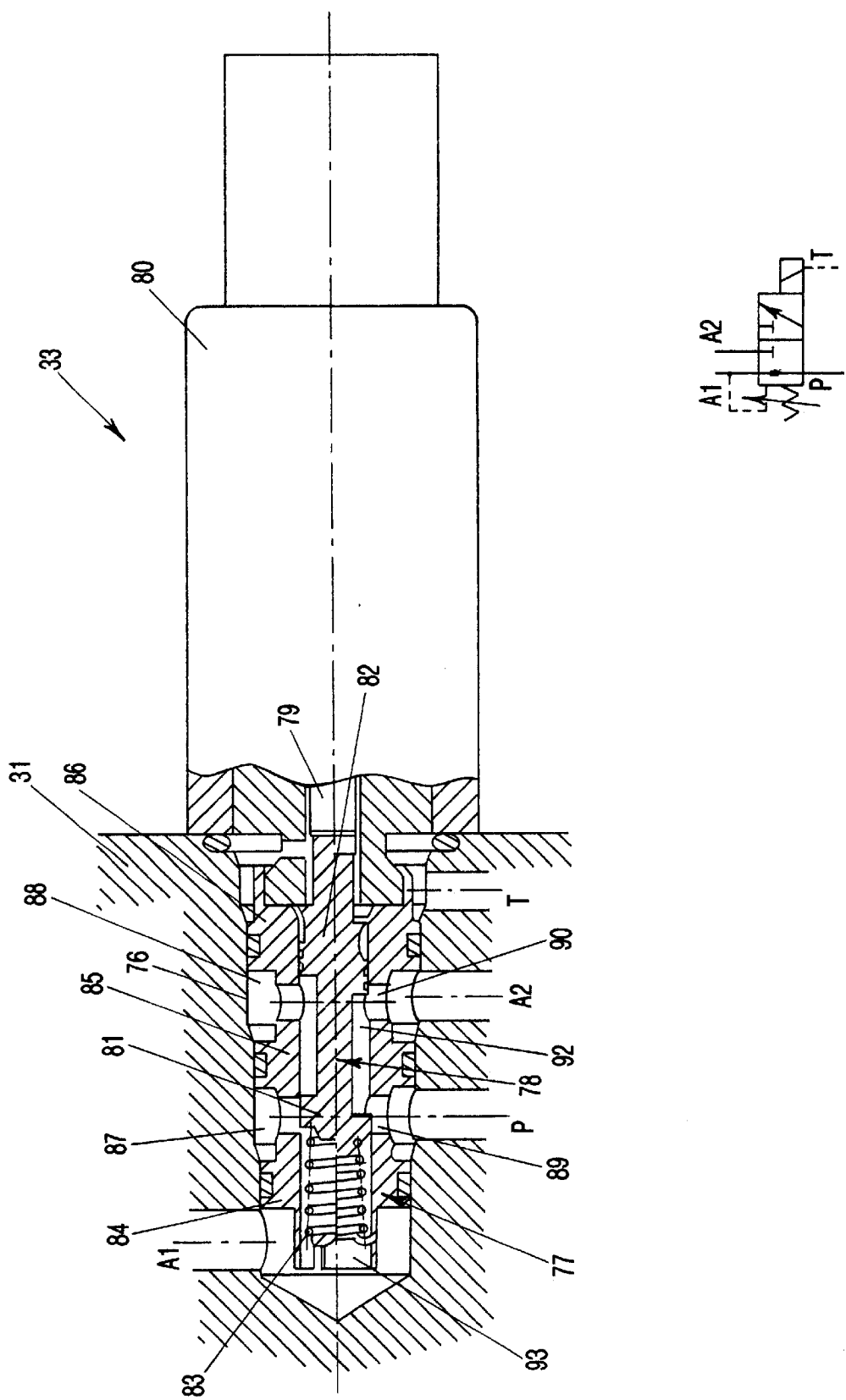
Figures 5A, 5B, 5C:
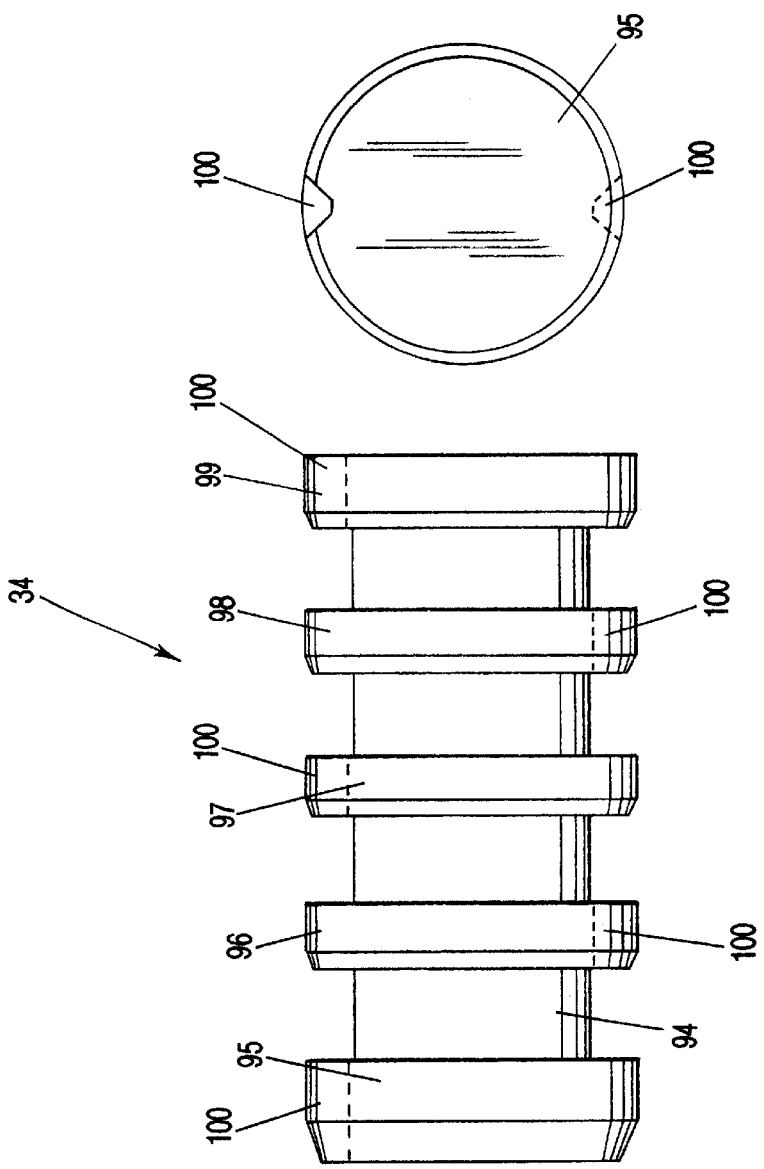

The invention will be explained in more detail with the aid of the drawings showing one embodiment. It is shown in:

FIG. 1 in a schematic representation an inventive hydraulic system;

FIG. 2 a circuit diagram of the hydraulic system according to FIG. 1;

FIG. 3 an axial section of the flow regulator valve of the inventive hydraulic system;

FIG. 4 a partial end view and partial axial section of the switch valve of the inventive hydraulic system;

FIG. 5a in a view in the direction of arrow a in FIG. 5b a throttle of the inventive hydraulic system;

FIG. 5b the throttle in a side view;

FIG. 5c a view in the direction of arrow b in FIG. 5b.

With the hydraulic system according to FIGS. 1 through 5c at least two functions in the vehicle are actuated. In the shown embodiment the hydraulic system serves for actuation of the steering system and the transmission, which may be an electric or electronic hydraulic gear shift actuation including clutch actuation. The hydraulic system can also, for example, be used for actuating a sunroof of a vehicle, the brake system etc.

FIG. 1 shows the hydraulic system with which the steering system 1 and the transmission 2 can be actuated. The steering system 1 has a piston 3 that can be loaded from both ends and is moveably mounted in a cylinder 4. The piston 3 separates two cylinder chambers 5 and 6 from one another into which a respective line 7, 8 opens via which the hydraulic medium can be supplied. The supply of hydraulic medium into the cylinder chambers 5, 6 is controlled by a 4/2-way valve.

The hydraulic medium is conveyed by a motor 10 and a pump 92 (FIG. 2) from the tank 11. It is provided with a fill level sensor 12 which monitors the fill level of the tank 11.

The hydraulic medium is supplied via a pressure line 13 to a switch valve 14 which will be explained in more detail with the aid of FIGS. 3 and 4. The hydraulic line 7 extending from the steering system 1 is connected to the switch valve 14. A further hydraulic line 15 extends from the switch valve 14 via a clutch valve 16 to a clutch 17 correlated with the transmission 2. The switch valve 14 ensures that the steering system 1, the clutch 17, and the transmission 2 are simultaneously supplied with hydraulic oil. The switch valve 14 is embodied such that the supply of hydraulic medium to the steering system 1 always has priority. This ensures that the vehicle is steerable in any situation.

The clutch valve 16 has correlated therewith a pressure sensor 18 and a storage device 19. A line 20 connects the clutch valve 16 to the clutch 17. Furthermore, the clutch valve 16 is connected by line 21 to a valve block 22 of a gear selector 23 with which in a known manner the gate of the transmission 2 can be selected and the respective gears can be selected in the selected gate. This is a so-called automated manual transmission in which the driver of the vehicle selects with a respective gear shift or via keypad the desired gears. The gear selector 23, the clutch 17, and the clutch valve 16 are connected to a control unit 24 with which the functions of these parts can be monitored and controlled. The control unit 24 can be actuated from the driver cabin 25 of the vehicle. As can be seen in an exemplary fashion in FIG. 1, in the driver cabin 25 a display 26 may be provided as well as a drive switch 27 and a park lock 28 which are all connected to the control unit 24. The transmission 2 and the clutch 17 have correlated therewith travel sensors 29, 30 which are connected to the control unit 24 and which monitor the travel stroke of the pistons which are components of the gear selector 23 and the clutch 17. The gear selector 23 has a cylinder for selecting the gate and for selecting the gear. Each cylinder of the gear selector 23 has correlated therewith a travel sensor 29 which advantageously operates in a contact-free manner. In the same way the travel sensor 30 of the clutch 17 also operates contact-free. The clutch valve 16 is provided with a protective function against voltage drop.

The switch valve 14, the clutch valve 16, the pressure sensor 18, and the storage device 19 are components of a valve block 31 which is used for oil distribution.

When the hydraulic system is switched on, filling of the storage device is monitored by the control unit 24. When the storage device is filled, the clutch valve 16 will receive a signal from the control unit 24 for opening. When the storage device 19 of the clutch valve 16 is provided with sufficient hydraulic oil, the switch valve 14 is switched back by the control unit 24. As soon as the clutch opens, it is possible to start up the internal combustion engine via the control unit 24.

As can be seen in FIG. 2, the switch valve 14 is comprised of a flow regulator valve 32 and a solenoid valve 33.

When the steering wheel 35 is not turned, the piston 3 of the steering system 1 is in the central position represented in FIG. 2. The directional control valve 9 is also in its central position so that the hydraulic oil is circulated without pressure. The solenoid valve 33 is embodied in a manner which will be disclosed in the following such that the greater part of the hydraulic oil flows via the flow regulator valve 32 to the steering system 1 while a smaller part flows via the line 15, in which a throttle 34 as well as a check valve 37 open in the direction of the clutch valve 16 are seated, is guided to the clutch valve 16. As an example, the solenoid valve 33 may be embodied such that 80% of the hydraulic oil will be guided to the steering system 1 while 20% will flow to the clutch valve 16. The clutch valve 16 is connected to the clutch 17 via the line 20. Via the line 21 the gear selector 23 is connected to the clutch valve 16. The gear selector 23 has an actuator 38 for selecting the gear and an actuator 39 for selecting the gate. The two actuators 38, 39 are embodied in a manner known to a person skilled in the art and are actuated by a respective piston/cylinder arrangement. The design of such actuators is known and will not be disclosed in detail in this context. By pressure loading the pistons 40, 41 of the actuators 38, 39, the levers 42, 43 are moved with which one switching shaft of the transmission 2 is moved or rotated about its axis in order to select the gate or the desired gear. Each actuator 38, 39 has correlated therewith two solenoid valves 44, 45 and 46, 47. They are connected via lines 48, 49 and 50, 51 to the corresponding pressures chambers 52, 53 and 54, 55 of the piston/cylinder units of the actuators 38, 39. The solenoid valves 44 through 47 are connected via lines 21 to the clutch valve 16. Furthermore, the solenoid valves 44 to 47 are connected via tank line 56, 57 to the tank 11 of the hydraulic system. Depending on the adjustment of the clutch valve 16, the corresponding solenoid valves 44 through 47 are actuated in order to select the desired gate or the desired gear. In the tank line 56 a check valve 58 is positioned which opens in the direction toward the tank 11.

The clutch 17 has a clutch actuator 59 with position sensor 30, as is known to a person skilled in the art.

When the steering wheel 35 is turned, pressure is generated in the cylinder 4 of the steering system 1. When the steering wheel 35 is turned to the right in the representation of FIG. 2, the steering spindle 60 will move the piston 3 to the right. The directional control valve 9 is switched by the switch element 61 such that the hydraulic medium will flow from the tank 11 via the line 7 into the pressure chamber 5 of the steering cylinder 4. The solenoid valve 33 is positioned as shown in FIG. 2. The hydraulic medium in the pressure chamber 6 flows via the line 8, the directional control valve 9, and the tank line 57 back to the tank 11. The solenoid valve 33 has a return line 62. Via it, the pressure, created when the steering wheel is turned, acts on the piston of the solenoid valve 33 and returns it even when the solenoid is excited. Accordingly, the connection A2 of the solenoid valve 33 is closed so that via the pressure connector P and the work connector A1 of the solenoid valve 33 the entire hydraulic medium is guided into the steering system 1.

When the steering wheel is turned in the reverse direction, the conditions are respectively reversed.

When no further rotation of the steering wheel 35 occurs, the directional control valve 39, controlled via the switch element 61, is returned into the center position shown in FIG. 2. Via the flow regulator valve 32, the oil supply is divided such that the greater part of the hydraulic medium will flow to the steering system 1 and the smaller portion to the clutch valve 16.

The flow regulator valve 32 (FIG. 3) has a bushing-shaped housing 63 which is inserted into the valve block 31 (FIG. 1). For sealing the housing 63 in the valve block, an annular seal 64 is positioned on the housing 63 and is housed in an annular groove 65 at the circumference of the housing 63. A bushing-shaped stop 66 is inserted into one end of the valve housing at which the valve piston 68 rests under the force of at least one pressure spring 67. The pressure spring 67 is supported with the other end at the adjusting screw 69 which is threaded into the other end of the valve housing 63. The adjusting screw 69 is seated sealingly with an annular seal 70 within the valve housing 63. The pre-tension of the spring 67 can be continuously and exactly adjusted via the adjusting screw 69.

The valve piston 68 has an axially penetrating bore 71 so that the hydraulic medium flowing through the stop 66 can flow through the valve piston 68 to a control bore 72 in the wall of the housing 63. Via the control bore 72 the hydraulic oil can be guided into the line 7 and thus to the steering system 1 (FIG. 2). In the bore 71 an aperture acting as a throttle 73 is positioned which is threaded into the end of the bore 71 of the valve piston 68 facing the stop 66. The flow cross-section of the throttle 73 is substantially smaller than that of the flow cross-section of the bore 71.

As shown in FIG. 2, the solenoid valve 33 is connected by line 74 to the flow regulator valve 32 arranged downstream. The line 74 is connected to the stop 66 via which the hydraulic oil flows in from the solenoid valve 33. It flows through the stop 66, the throttle 73, and the valve piston 68 to the control bore 72 via which the hydraulic oil is guided into the line 7 and from there via the directional control valve 9 to the steering system 1.

As is shown in FIG. 2, the line 15 extending to the clutch valve 16 is branched off the line 74. A small portion of the hydraulic oil is guided in the manner disclosed to the clutch valve 16.

The solenoid valve 33 (FIG. 4) is connected to the valve block 31 which advantageously receives also the flow regulator valve 32. The valve block 31 has a bore 76 into which a housing 77 is inserted in a sealing manner. It receives a piston 78 which rests at a plunger 79 of the solenoid 80 of the valve 33. The piston 78 has two stays 81, 82 spaced at a distance from one another which rest at the inner wall of the housing 77. A pressure spring 83 is inserted into the housing 77, with the piston 78 resting at one end thereof.

The housing 77 has three annular stays 84 through 86 which are axially spaced from one another. The housing rests via the annular stays 84 through 86 at the inner wall of the bore 76 in a sealing manner. Between the annular stays 84 through 86 the annular chambers 87, 88 are defined into which the respective bores 89, 90 open. The bores 89 are in flow connection with the pressure connector P of the valve block 31 and the bore 90 with the work connector A2. The valve block 31 has also a work connector A1 and a tank connector T. Via the work connector A1 the hydraulic oil will flow via the line 7 (FIG. 2) to the directional control valve 9 and to the steering system 1. A line 47 is connected to the work connector A2 which extends to the flow regulator valve 32 and is connected to the line 15 which connects the solenoid valve 33 to the clutch valve 16. The pressure connector P is in flow connection with the pump 91 (FIG. 2) and the connector T is in flow connection with the tank 11 of the hydraulic system.

Between the two stays 81, 82 of the piston 78 an annular chamber 92 is provided into which the hydraulic medium can flow.

In the upper half of FIG. 4, the piston 78 is represented in a position with the solenoid 80 not being excited. The piston 78 is pressed by the force of the spring 83 against the retracted plunger 79 of the solenoid 80. In this position, the stay 82 of the piston 78 will release the bores 90 of the housing 77, the stay 82 being adjacent to the solenoid 80. The other stay 81 of the piston 78 closes the bore 89 so that via the pressure connector P hydraulic medium cannot flow to the work connector A2. The pressure connector P in this position of the piston is however flow-connected via the work connector A1 to the steering system 1. The stay 81 is narrower than the axial width of the bore 89 so that the hydraulic medium can flow from the pressure connector P via the annular chamber 87 and the portion of the bores 89, positioned before the annular stay 81 of the piston 78, into the space 93 of the housing 72 surrounding the pressure spring 88. The space 93 is open in the direction of the work connector A1 so that the hydraulic medium can flow to this connector. Accordingly, when the solenoid 80 is not excited, the hydraulic medium can always flow to the steering system 1 of the vehicle. Since the stay 81 of the piston 78 shuts down the flow of hydraulic medium from the annular chamber 97 to the annular chamber 88, the entire hydraulic medium will flow via the work connector A1 to the steering system 1.

When the solenoid 80 is excited, the plunger 79 is extended and the piston 78 is displaced by it against the force of the pressure spring 83 (lower half of FIG. 4). Via the annular chamber 92 between the stays 81, 82 the pressure connector P is now connected with the work connector A2. However, the pressure connector P is separated by the stay 82 of the piston 78 from the work connector A1. As can be seen in FIG. 2, the hydraulic medium flows from the work connector A2 via the line 74 to the current control valve 32. A small portion of the hydraulic medium flows also via the line 15 to the clutch valve 16. In this manner it is ensured that the steering system 1, even when the solenoid 80 is excited, is supplied with a sufficient amount of hydraulic medium.

The spacing of the two stays 81, 82 of the piston 78 from one another is smaller than the smallest spacing of the control bores 89, 90 of the housing 77. This ensures that the two work connectors A1, A2 cannot be closed by the piston 78 simultaneously.

In the line 15 the throttle 34 is positioned which will be explained in the following with the aid of FIG. 5a through FIG. 5c. This throttle 34 is also arranged within the valve block 31 and has a cylindrical base member 94 which is provided over its length with annular stays 95 through 99 which are positioned at a spacing to one another. Each one of the annular stays 95 through 99 is provided at the circumference with a depression 100 opening toward the edge through which the hydraulic medium can flow. The depressions 100 have a substantially triangular contour when viewed in the axial direction of the throttle 34 and taper radially inwardly. The throttle 34 is positioned in a sealing manner in a corresponding bore of the valve block 31. The hydraulic medium flowing through the line 36 can flow only through the depressions 100 into the annular stays 95 through 99. Advantageously, the depressions 100 of neighboring annular stays 95 through 99 are staggered relative to one another in the circumferential direction of the apertures. In the represented embodiment, the depressions 100 of neighboring annular stays are staggered by 180° relative to one another. The hydraulic medium flowing through the depressions 100 of the annular stay 95 reaches the annular chamber between the two annular stays 95, 96. It can then only flow through the staggered depressions 100 of the annular stay 96 into the annular chamber between the stays 96, 97. From here the hydraulic medium will flow through the 180°-staggered depression 100 of the annular stay 97 into the adjacent annular chamber between the stays 97, 98. In this manner, the hydraulic medium, when viewed in a side view, will flow back and forth in a rectangular wave shape through the throttle 34. Because of the serial arrangement of the individual annular stays 95 through 99 with the depressions 100 a high throttle effect will result. Soiling of the throttle 34 is reliably prevented. Due to the cascade-like embodiment of the throttle 34 no flow noise will result. The disclosed throttle 34 has only a minimal temperature dependency. The depressions 100 of the annular stays 95 through 99 are of identical design. Their radial depth is only one-fourth of the radius of the respective annular stays 95 through 99. The shape of the depressions 100 provides for an easy adjustment of the throttle effect. The number of stays provided can also be used for adjusting the throttle effect according to the desired application.

The hydraulic system is designed such that the steering system 1 with respect to supply of hydraulic medium has priority. The solenoid valve 33 ensures that the clutch 17 and the transmission 2 are supplied with hydraulic medium only when the steering system 1 is not moved and the oil supply of the steering system 1 is ensured. When the steering system 1 is actuated and, accordingly, hydraulic medium is required, the switch valve 14 will interrupt the supply of hydraulic medium in the direction toward the clutch 17 and the transmission 2. When the clutch 17 and the transmission 2 require hydraulic medium during a steering action of the vehicle, the supply of the steering system 1 with hydraulic medium will not be interrupted but only reduced. In the embodiment the supply of hydraulic medium to the steering system 1 in this case will be reduced, for example, by approximately 20% so that the steering system 1 still is supplied with approximately 80% of the hydraulic medium in order to ensure the steering function. The switching process of the switch valve 14 does not interrupt the supply to the steering system because the solenoid valve 33 is designed such that the piston 78 cannot simultaneously close the work connectors A1 and A2. With the disclosed hydraulic system a flip switching as well as an automatic switching is possible with respect to the transmission 2. With respect to the transmission it is possible to employ sport driving programs, winter condition driving programs, etc. The fuel consumption is reduced by up to 8% when using the disclosed hydraulic system.

In regard to the steering system, a considerable reduction in the power uptake is achieved. For maximum motor rpm the power uptake in comparison to known devices is reduced by approximately 0.8 kW. The power uptake of the steering system 1 is constant independent of the motor rpm, i.e., in idle conditions at extremely low rpm a full power steering function of the steering system 1 is ensured. The hydraulic system is suitable for start-stop operation. The power uptake of the steering system for straight driving conditions of the vehicle is approximately 50 W. When the vehicle is supplied with steering angle sensors, a velocity-dependent control of the steering system 1 is possible.

Since the switch valve 14 and the clutch valve 16 are mounted in the valve block 31, the hydraulic system requires only a minimum mounting space. Because of the disclosed add-on principle, no manufacturing investments for the steering system and the transmission of the vehicle are required. The modular principle of the individual components requires only a minimal expenditure for new systems. By combining the components of the steering system and of the transmission, short serial replacement durations are possible. Furthermore, the system price for the combination of the two functions can be kept low.

By taking into consideration the oil consumption over time, further functions within the vehicle can be added, for example, for special driving-independent systems such as the sunroof. Also, other supply connections are possible, for example, with respect to an anti-lock brake system or chassis adjustment. Other connections of the steering system 1 are possible such as with a hydraulic brake force enhancing system, a hydro motor for a venting system for motor cooling, a hydraulic convertible roof control, a hydraulic system for handicapped cars (doors, ramps), a hydraulic four wheel drive lock control, a hydraulic window operating system, a hydraulic actuation of the windshield wipers, a hydraulic opening and closing of wing doors, revolving doors, rear hatch doors, sliding doors, exterior pivot-type doors etc. and also an electro-hydraulic central lock system.

For the individual functions, despite the increased comfort for actuation of the functions, additional drives are not required. Advantages of the disclosed embodiment are savings in regard to further drive components, a high output density and flexibility of the hydraulic system, flexible mounting and arrangement, the elimination of conventional motor add-on components at the actual main drive system of the vehicle, energy savings by dividing the functions, weight reduction by reducing the supply units, vibration-technological decoupling of the internal combustion engine, and the simple retrofitting of the device.

The cascade-type throttle 34 mounted upstream of the clutch valve 16 limits the maximum oil flow in direction toward the clutch 17 and the transmission 2 such that even for total pressure loss in the system clutch-transmission, the main supply for the steering system 1 is maintained. The sensors 12, 18 for the oil supply can detect oil loss over time and evaluate it. The connection to the evaluation of the pressure loss gradient of the clutch/transmission-side pressure sensor 18 in values below the minimum pressure required for switching and of the limited hydraulic medium flow in the direction toward the clutch 17 and the transmission 2, it is possible to detect in a timely manner external leakage and to interrupt via the solenoid valve 33 the supply of hydraulic medium to the clutch 17 and the transmission 2. A leakage at the steering system can be determined by the oil measuring stick in the vehicle. Furthermore, the same safety as with the already present power system is possible via an auxiliary drive.

What is claimed is:

1. A hydraulic system for a motor vehicle having at least one tank for hydraulic medium and having first and second operational areas, comprising:
    a distributor valve (14) comprising a flow regulator valve (32) and a solenoid valve (33);
    a clutch valve (16) connected to said distributor valve (14), said clutch valve (16) controlling the flow of hydraulic medium to said second operational area (2, 17) such that said first operational area (1) has priority over said second operational area (2, 17);
    wherein the solenoid valve (33) closes a supply of hydraulic medium to said clutch valve (16) of said second operational area (2, 17) when the first operational area (1) is operating, said solenoid valve (33) being adapted to release a small amount of hydraulic medium to the clutch valve (16) of said operational area (2, 17) during operation of said first operational area (1) if hydraulic fluid is required by said second operational area (2, 17).

2. The hydraulic system of claim 1, wherein said solenoid valve (33) comprises two work connectors (A1, A2), each of said work connectors (A1, A2) being connected to either said first or second operational area.

3. The hydraulic system of claim 2, wherein said solenoid valve (33) further comprises a housing (17) having at least one bore (89, 90), each of said at least one bore (89, 90) corresponding to one of said work connectors (A1, A2), said solenoid valve including a piston (78) having two stays (81, 82), said two stays (81, 82) having an axial width smaller than a cross-sectional surface of said at least one bore (89, 90).

4. The hydraulic system of claim 2, wherein said solenoid valve (33) includes a pressure connector (P) and a tank connector (T).

5. The hydraulic system of claim 1, wherein said flow regulator valve (32) is disposed downstream of said solenoid valve (33) and wherein said flow regulator valve (32) is connected to a work connector (A2).

6. The hydraulic system of claim 5, wherein said flow regulator valve (32) includes a piston (68) having a throttle (73) therein.

7. The hydraulic system of claim 6 wherein said piston (68) has an axially extending throughbore (71) in which said throttle (73) is mounted.

8. The hydraulic system of claim 6, wherein said piston (68) is moveable by pressure of the hydraulic medium against a spring force.

9. The hydraulic system of claim 8, wherein said spring force is adjustable.

10. The hydraulic system of claim 5, wherein said flow regulator valve (32) is correlated to said first operational area (1) and said clutch valve (16) is correlated with said second operational area (2, 17).

11. The hydraulic system of claim 1, wherein said clutch valve (16) is arranged downstream of said solenoid valve (33).

12. The hydraulic system of claim 11, wherein a throttle (34) is disposed between said solenoid valve (33) and said clutch valve (16).

13. The hydraulic system of claim 12, wherein said throttle (34) is cascade-like.

14. The hydraulic system of claim 12, wherein said throttle (34) has a base member (94) having at least two spaced apart annular stays (95–99), each of said at least two stays having a through opening (100) for the hydraulic medium.

15. The hydraulic system of claim 14, wherein said through openings (100) are staggered relative to one another in a circumferential direction of said annular stays.

16. The hydraulic system of claim 15, wherein said through openings (100) are staggered relative to one another by 180 degrees.

17. The hydraulic system of claim 14, wherein said through openings (100) comprise depressions disposed at edges of said annular stays (95–99).

18. The hydraulic system of claim 1, wherein said distributor valve (14) and said clutch valve (16) are arranged in a valve block (75).

* * * * *